United States Patent [19]
Polegato

[11] Patent Number: 5,983,524
[45] Date of Patent: Nov. 16, 1999

[54] VAPOR-PERMEABLE SHOE

[75] Inventor: Mario Polegato, Crocetta del Montello, Italy

[73] Assignee: Nottington Holding B.V., Amsterdam, Netherlands

[21] Appl. No.: 08/849,839

[22] PCT Filed: Oct. 9, 1996

[86] PCT No.: PCT/EP96/04382

§ 371 Date: Jun. 10, 1997

§ 102(e) Date: Jun. 10, 1997

[87] PCT Pub. No.: WO97/14326

PCT Pub. Date: Apr. 24, 1997

[30] Foreign Application Priority Data

Oct. 13, 1995 [IT] Italy ................................ PD95A0190
May 17, 1996 [IT] Italy ................................ PD96A0126

[51] Int. Cl.⁶ ............................................ A43B 13/12
[52] U.S. Cl. ........................................ 36/3 R; 36/30 R
[58] Field of Search ......................... 36/3 R, 3 B, 30 R, 36/30 A, 75 R

[56] References Cited

U.S. PATENT DOCUMENTS

| | | | |
|---|---|---|---|
| 3,975,840 | 8/1976 | Juzenko | 36/75 R |
| 4,359,783 | 11/1982 | Andrews | 36/4 |
| 4,481,726 | 11/1984 | Phillips | 36/30 R |
| 4,507,880 | 4/1985 | Ohashi | 36/3 B |
| 4,899,465 | 2/1990 | Bleimhofer et al. | 36/12 |
| 5,746,012 | 5/1998 | Caletti et al. | 36/3 B |

FOREIGN PATENT DOCUMENTS

| | | |
|---|---|---|
| A-0080710 | 6/1983 | European Pat. Off. . |
| A-0275644 | 7/1988 | European Pat. Off. . |
| A-0334038 | 9/1989 | European Pat. Off. . |
| A-0382904 | 8/1990 | European Pat. Off. . |
| A-0619959 | 10/1994 | European Pat. Off. . |
| A-0728424 | 8/1996 | European Pat. Off. . |

*Primary Examiner*—M. D. Patterson
*Attorney, Agent, or Firm*—Oblon, Spivak, McClelland, Maier & Neustadt, P.C.

[57] ABSTRACT

A vapor permeable shoe, including the following combination of elements: a vapor-permeable upper associated with a vapor-permeable or perforated lining, a tread made of perforated elastomer, a mid-sole comprising at least one membrane made of waterproof vapor-permeable material that is associated with a lower protective layer made of hydrolysis-resistant, water-repellent, vapor-permeable or perforated material, a vapor-permeable or perforated insole, a vapor-permeable or perforated filler layer arranged between the insole and the membrane. The lower part of the upper, the tread, the mid-sole with the membrane are perimetrically sealed in the coupling regions.

46 Claims, 6 Drawing Sheets

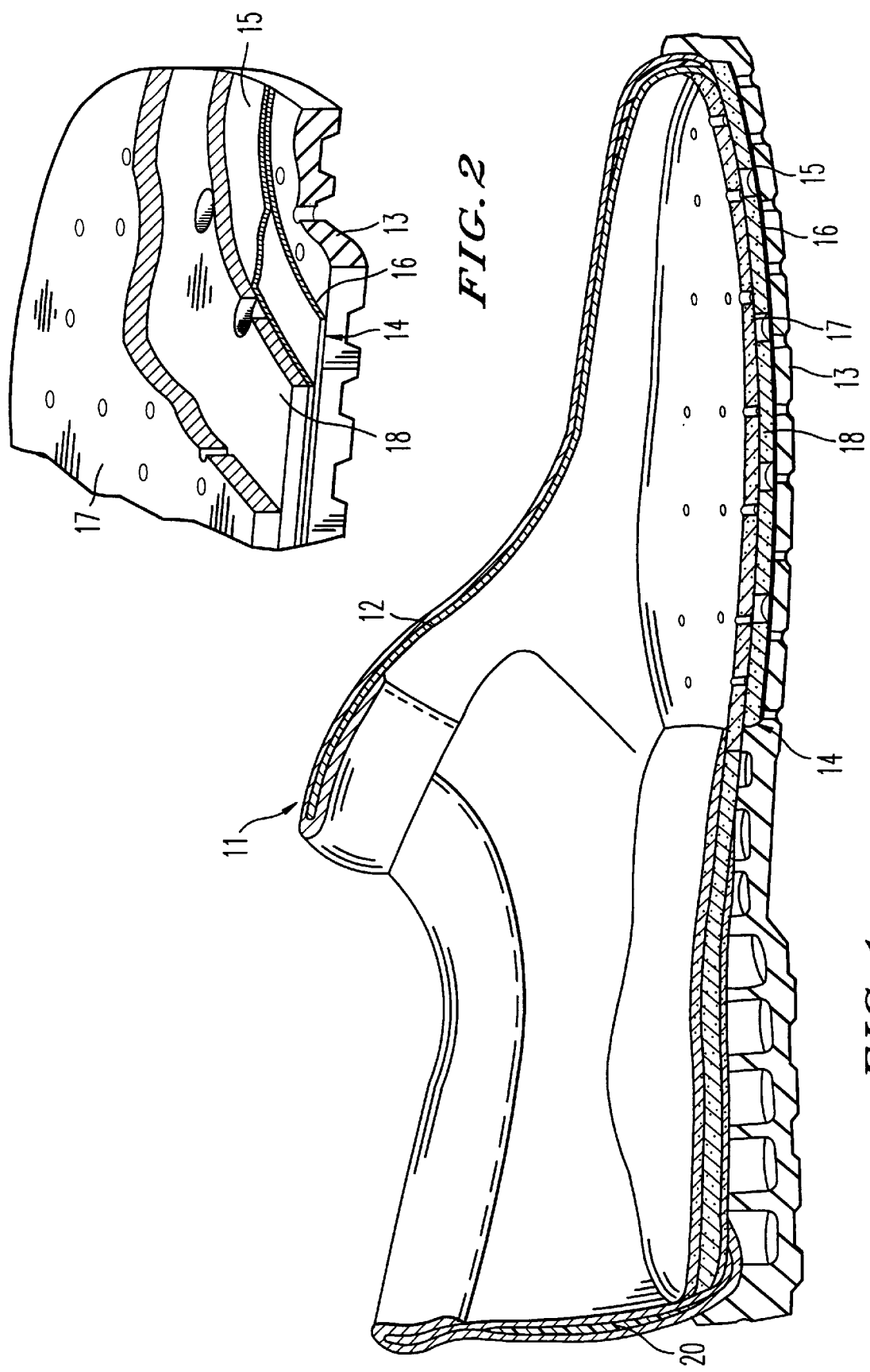

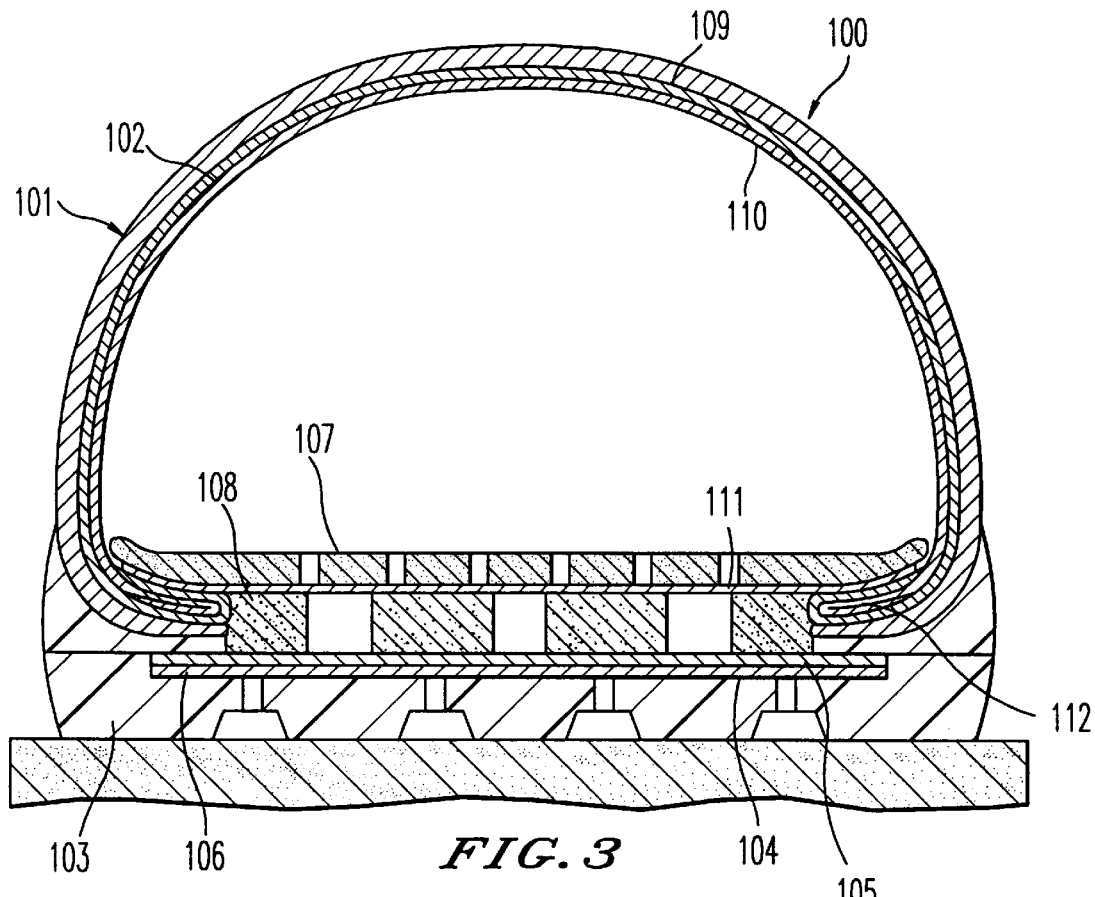
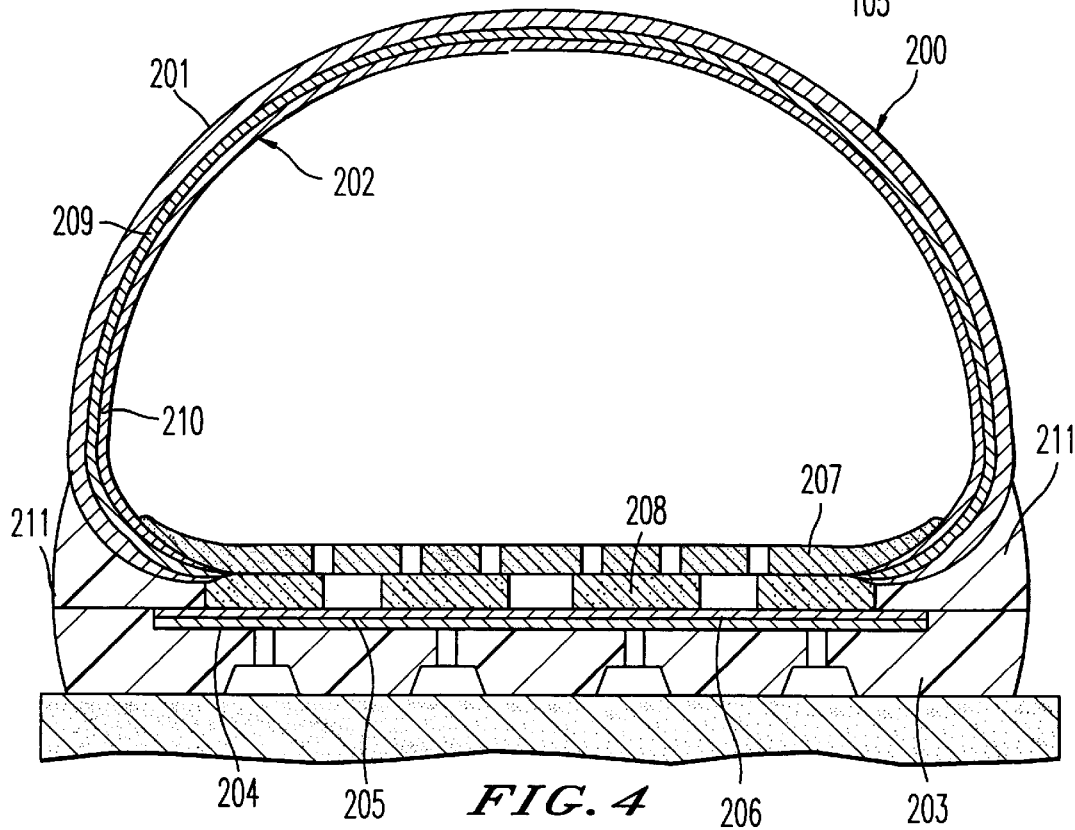

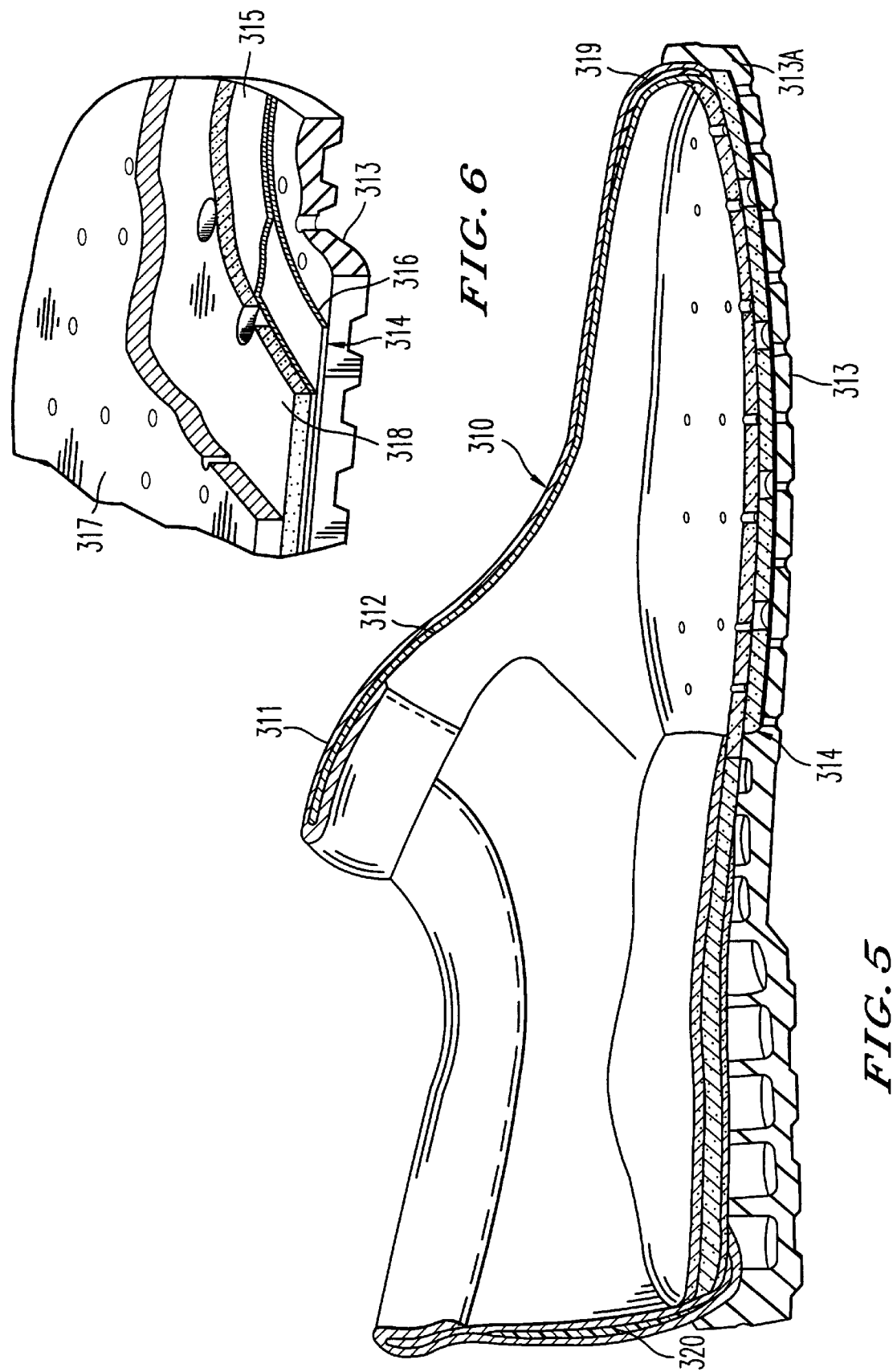

VAPOR-PERMEABLE SHOE

TECHNICAL FIELD

The present invention relates to a vapor-permeable shoe.

BACKGROUND ART

It is known that a shoe, in order to be comfortable, must ensure the correct exchange of heat and water vapor between the internal microclimate of the shoe and the external climate.

This exchange of heat and water vapor, however, must not compromise in any way the tightness of the shoe with respect to external moisture or water.

Currently commercially available shoes entrust this heat and water vapor exchange substantially to the upper or to the sole.

As regards the upper, shoes provided with perforations and/or with linings made of vapor-permeable and waterproof material are currently commercially available.

In some models, parts of the upper may be replaced with materials that are indeed waterproof and at the same time vapor-permeable.

Another category of shoes instead entrusts vapor-permeability to the sole, again by using layers of waterproof and vapor-permeable material, optionally associated with protective layers and fillers.

DISCLOSURE OF THE INVENTION

A principal aim of the present invention is to provide a vapor-permeable shoe that allows the exchange of heat and water vapor both through the upper and through the sole, ensuring at all times an optimum internal microclimate as a function of the external climate.

Accordingly, an object of the present invention is to provide a vapor-permeable shoe the structure whereof is in no way restrictive in terms of styling and aesthetic research, allowing the greatest freedom in shoe shapes and types.

Another object of the present invention is to provide a vapor-permeable shoe that is meant both for everyday use and for sports use.

Another object of the present invention is to provide a vapor-permeable shoe the cost whereof is competitive with respect to the costs of conventional vapor-permeable shoes.

Another object of the present invention is to provide a vapor-permeable shoe that can be manufactured with conventional technologies.

This aim, these objects, and others that will become apparent hereinafter are achieved by a vapor-permeable shoe, according to the present invention, characterized in that it comprises the following combination of elements:

- a vapor-permeable upper associated with a vapor-permeable or perforated lining;
- a tread made of perforated elastomer;
- a mid-sole comprising at least one membrane made of waterproof vapor-permeable material that is associated with a lower protective layer made of hydrolysis-resistant, water-repellent, vapor-permeable or perforated material;
- a vapor-permeable or perforated insole;
- a vapor-permeable or perforated filler layer arranged between said insole and said membrane;
- the lower part of said upper, said tread, said mid-sole with said membrane being perimetrically sealed in the coupling regions.

BRIEF DESCRIPTION OF THE DRAWINGS

Further characteristics and advantages of the present invention will become apparent from the following detailed description of eight embodiments thereof, illustrated only by way of non-limitative example in the accompanying drawings, wherein:

FIG. 1 is a longitudinal sectional view of a shoe according to the invention, in a first embodiment;

FIG. 2 is an axonometric cutout view of a detail of the shoe of FIG. 1;

FIG. 3 is a transverse sectional view of a shoe according to the invention, in a second embodiment;

FIG. 4 is a transverse sectional view of a shoe according to the invention, in a third embodiment;

FIG. 5 is a longitudinal sectional view of a shoe according to the invention, in a fourth embodiment;

FIG. 6 is an axonometric cutout view of a detail of the shoe of FIG. 5;

WAYS OF CARRYING OUT THE INVENTION

Figure 7:
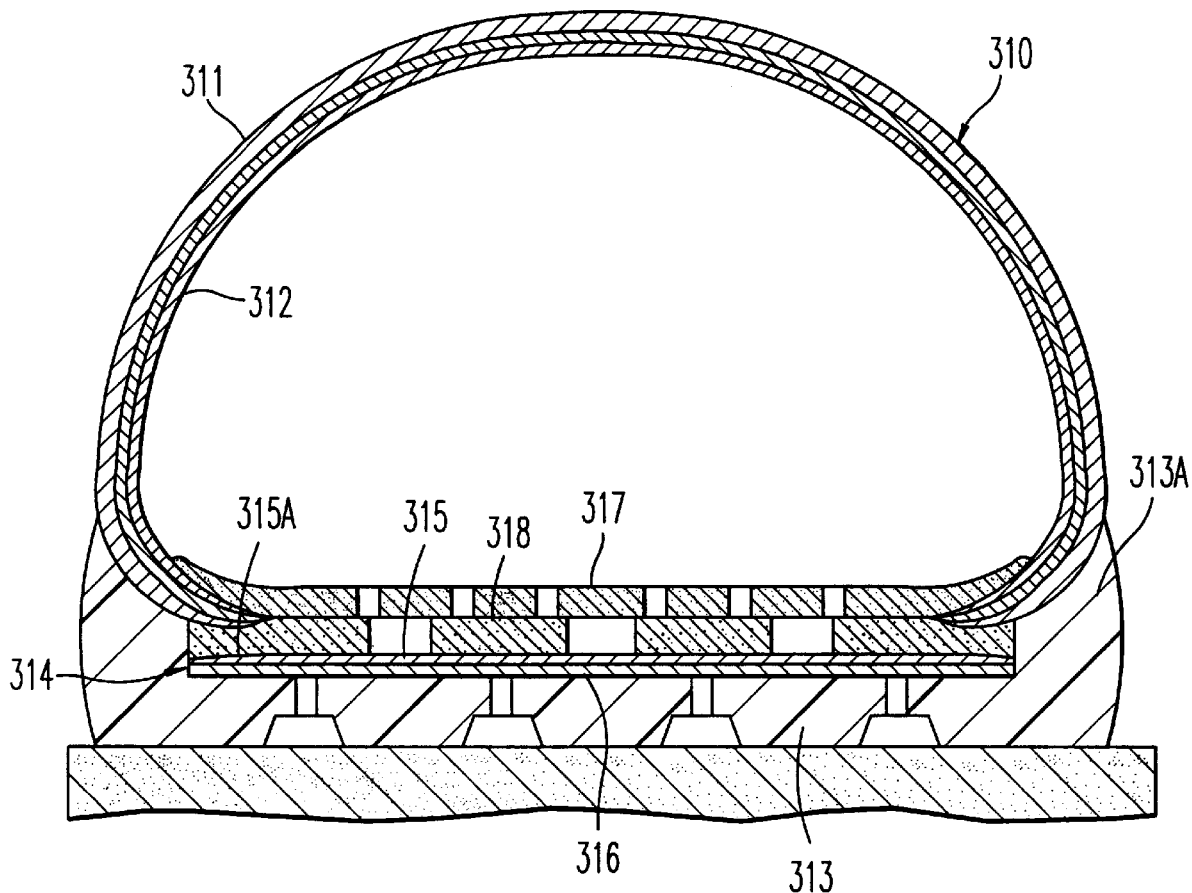
FIG. 7 is a transverse sectional view of the shoe of FIG. 5.

With particular reference to FIGS. 1 and 2, a vapor-permeable shoe, according to the invention, is generally designated by the reference numeral 10 in a first embodiment.

The shoe 10 comprises, in this case, an upper 11 that is vapor-permeable (made for example of natural leather without sealing pigments) and is associated with a vapor-permeable or perforated lining 12 (for example made of so-called "cambrelle").

The lining 12 is associated with the upper 11 by spot gluing, so as to avoid compromising transpiration through said upper.

The shoe 10 furthermore comprises a tread 13 made of perforated elastomer and a mid-sole, generally designated by the reference numeral 14, that comprises a membrane 15 made of waterproof and vapor-permeable material, such as those commercially available and commonly defined by the trade name GORE-TEX, associated with a protective layer 16 that is directed towards the tread 13 and is made of a hydrolysis-resistant, water-repellent, vapor-permeable or perforated material.

The shoe 10 also comprises: an insole 17 made of vapor-permeable material (for example natural leather) or perforated material, with an optional heel seat made of soft leather with absorbent latex rubber, and a perforated filler layer 18 made of injected thermoplastic material that is arranged on the tread 13 with the membrane 15.

A vapor-permeable or perforated toe cup 19 is furthermore applied to the shoe 10, in this first embodiment, and is associated with the upper 11 by spot gluing so as to ensure its transpiration.

Likewise, a rear vapor-permeable or perforated counter 20 is associated with the upper 11 by spot gluing.

The upper 11, in this case, is associated with the insole 17 by applying a layer of glue along a perimetric band.

Limiting the gluing layer to a perimetric band allows to leave transpiration unaffected over much of the surface of the foot sole.

The shoe 10 in fact has a central part of the insole that is entirely free of any element that is impermeable to water vapor (non-vapor-permeable).

Furthermore, the membrane 15 and the lower protective layer 16 are coupled one another by spot gluing, by using a commercially available adhesive that is resistant to hydrolysis (a type commonly known as "hot merc" or systems with calendered powders).

As regards the protective layer 16, it can be conveniently made of water-repellent material capable of quickly drying, such as for example non-woven fabric or needle-loomed felt, or KEVLAR.

Said protective layer 16 is furthermore directed downwards, i.e., towards the tread 13, since it must protect the membrane 15 against external impacts or against foreign objects that may penetrate through the holes formed in said tread 13.

The association between the protective layer 16 and the tread 13 occurs by means of a commercially available and hydrolysis-resistant adhesive by spot gluing or by gluing along a perimetric band, so as to ensure vapor-permeability of the sole as a whole.

Furthermore, the coupling of the membrane 15 to the filler layer 18 and to the tread 13 must be provided so as to ensure a seal against external water along its entire perimeter, and this can occur by perimetric gluing, by using hydrolysis-resistant adhesives or high-frequency welding or through overlap injection-molding, on the tread 13, of compatible material that allows perfect adhesion of the membrane 15 to the tread 13 directly or by means of the protective layer 16.

The shoe according to the invention, as shown by the description of this first embodiment thereof, is vapor-permeable as a whole, any non-vapor-permeable regions having been limited substantially to the perimetric regions of the sole, which must besides ensure a good seal against water and external moisture.

Vapor-permeability can be increased further, through the sole as a whole, if the insole 17 is applied to the upper 11 with stitches, so that the entire surface of said insole 17 is vapor-permeable because it is not affected by glue.

With particular reference to FIG. 3, a shoe according to the invention is generally designated by the reference numeral 100 in a second embodiment.

The shoe 100 comprises an upper 101 that is associated with an internal lining 102 that is generally vapor-permeable or perforated.

The shoe 100, like the shoe 10, comprises a perforated elastomeric tread 103 and a mid-sole, generally designated by the reference numeral 104, that comprises a membrane 105 of waterproof and vapor-permeable material associated with a lower protective layer 106 made of hydrolysis-resistant, water-repellent, vapor-permeable or perforated material.

The shoe 100 furthermore comprises a vapor-permeable or perforated insole 107 and a vapor-permeable or perforated filler layer 108 that is arranged between said insole 107 and the membrane 105.

The shoe 100 differs from the shoe 10 in that the lining 102 is composite, since it is formed by an outer layer, constituted by a waterproof and vapor-permeable membrane 109 the characteristics whereof are similar to those of the membrane 105, and by an inner layer, which is directed towards the foot, is designated by the reference numeral 110, and is made of leather or vapor-permeable fabric.

In this second embodiment, the perimetric region of the shoe 100 is furthermore sealed by folding the advantageously protruding edge of the membrane 109, which is welded, again along a perimetric band, to the edge of a waterproof and vapor-permeable membrane 111 the characteristics whereof are similar to those of the membrane 105; said membrane 111 is arranged below the insole 107 with which it is associated.

More specifically, the membrane 109 is cut so that it is larger than the upper 101 and its border protrudes from said upper.

During the application of the insole 107, of the mid-sole 104, and of the tread 103, the excess border of the membrane 109 is folded upwards and outwards, so as to provide a perimetric surface whereon the corresponding perimetric border of the membrane 111 is glued.

In this manner, the membrane 109 forms a perimetric pocket 112 that seals the sole as a whole against water and external moisture.

Furthermore, if part of the insole 107 is glued to the tread 103, water is also sealed out of the lightening hollows.

With particular reference to FIG. 4, a shoe according to the invention is generally designated by the reference numeral 200 in a third embodiment.

The shoe 200 comprises an upper 201 that is associated with a lining 202.

The shoe 200 furthermore comprises a tread 203 made of perforated elastomer and a mid-sole, generally designated by the reference numeral 204, which comprises a membrane 205 made of waterproof and vapor-permeable material that is associated with a lower protective layer 206 made of a hydrolysis-resistant, water-repellent, vapor-permeable or perforated material.

The shoe 200 furthermore comprises a vapor-permeable or perforated insole 207 and a vapor-permeable or perforated filler layer 208 that is arranged between the insole 207 and the membrane 205.

As in the second embodiment, the shoe 200 has a lining 202 that is composite, since it is constituted by an outer layer, constituted by a membrane 209 made of vapor-permeable waterproof material with characteristics that are similar to those of the membrane 205, and by an inner layer 210, made of leather or vapor-permeable fabric.

This third embodiment differs from the second one in the method used to seal the lower perimetric regions.

In this third embodiment, the perimetric region is in fact waterproofed by welding the membrane 209 directly on the tread 203 or on a sealing element 211 that is also formed monolithically with respect to the tread 203.

With particular reference now to FIGS. 5, 6, and 7, a vapor-permeable shoe according to the invention is generally designated by the reference numeral 310 in a fourth embodiment.

The shoe 310 comprises, in this case, a vapor-permeable upper 311 (made for example of natural leather without sealing pigments) associated with a vapor-permeable or perforated lining 312 (for example made of so-called "cambrelle").

The lining 312 is associated with the upper 311 by spot gluing, so as to avoid compromising transpiration through said upper.

The shoe 310 furthermore comprises a tread 313, which is made of elastomer, is perforated at the bottom, and has a raised border 313a, and a mid-sole, generally designated by the reference numeral 314, that comprises a membrane 315 made of waterproof and vapor-permeable material, such as those commercially available and commonly defined by the trade-name GORE-TEX, associated with a protective layer 316, which is directed towards the tread 313, is made of hydrolysis-resistant, water-repellent, vapor-permeable or perforated material, and is thinner in the perimetric regions to move the membrane 315 gradually closer to the tread 313.

The mid-sole 314 is surrounded by the border 313a of the tread 313.

The shoe 310 furthermore comprises: an insole 317 made of vapor-permeable material (for example natural leather) or perforated material, with an optional heel seat made of soft leather with absorbing latex rubber, and a filler layer 318 made of vapor-permeable felt arranged on the tread 313 with the membrane 315.

A vapor-permeable or perforated tip 319 is furthermore applied to the shoe 310, in this fourth embodiment, and is associated with the upper 311 by spot gluing so as to ensure its transpiration.

Likewise, a vapor-permeable or perforated rear counter 320 is associated with the upper 311 by spot gluing.

The upper 311, in this case, is associated with the insole 317 by applying a layer of glue along a perimetric band.

Limiting the gluing layer to a perimetric band allows to keep transpiration intact for much of the surface of the foot sole.

In the shoe 310, the central part of the insole is in fact entirely free of any element that is impermeable to water vapor (non-vapor-permeable).

The membrane 315 and the protective layer 316 are coupled one another by spot gluing, by using a commercially available hydrolysis-resistant glue (of the type commonly known as "hot merc" or systems with calendered powders).

As regards the protective layer 316, it can be conveniently made of water-repellent material capable of drying quickly, such as for example non-woven fabric or needle-loomed felt.

Furthermore, said protective layer 316 is directed downwards, i.e., towards the tread 313, since it must protect the membrane 315 against external impacts or against foreign objects that might penetrate through the holes formed in said tread 313.

According to the invention, the membrane 315 is joined to the tread 313 by means of a commercially available hydrolysis-resistant adhesive along a perimetric band 315a, where the protective layer 316 is thinner and therefore the adhesive can penetrate so as to pass through it, forming a sandwich-like unit.

The membrane 315 must furthermore be fixed to the tread 313 so as to ensure tightness against external water along its entire perimeter, and this can occur by gluing, using hydrolysis-resistant glues or with high-frequency welds or also by overlap injection-molding, on the tread 313, of compatible material that allows perfect adhesion.

The shoe according to the invention, as shown by the description of this fourth embodiment, is generally vapor-permeable, any non-vapor-permeable regions having been limited substantially to the perimetric regions of the sole, which must in any case ensure tightness against water and external moisture.

Transpiration can be increased further, through the sole as a whole, if the insole 317 is applied to the upper 311 with stitches, thus allowing the entire surface of the insole 317 to be vapor-permeable since it is not affected by glue.

Figure 8:
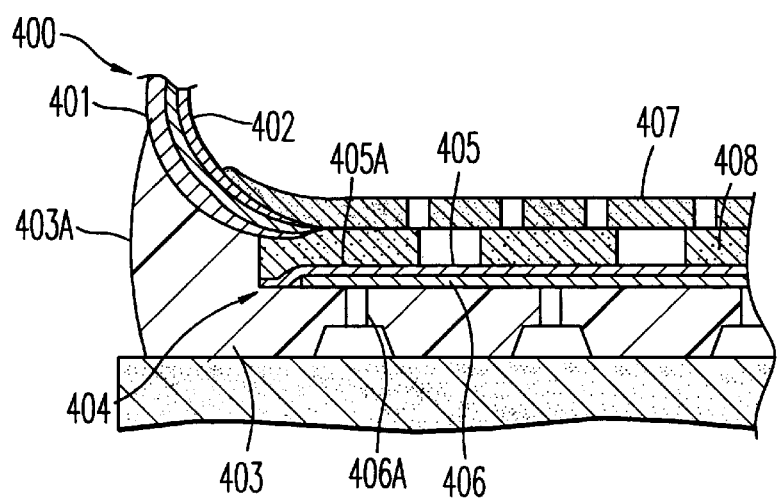
FIG. 8 is a transverse sectional view of a shoe according to the invention in a fifth embodiment.

With particular reference to FIG. 8, a shoe according to the invention is generally designated by the reference numeral 400 in a fifth embodiment.

The shoe 400 comprises an upper 401 that is associated with an internal lining 402 that is generally vapor-permeable or perforated.

The shoe 400, like the shoe 310, comprises a tread 403, made of perforated elastomer with a raised border 403a, and a mid-sole that is generally designated by the reference numeral 404 and comprises a membrane 405, made of waterproof and vapor-permeable material, that is associated with a lower protective layer 406 made of hydrolysis-resistant, water-repellent, vapor-permeable or perforated material, the border 406a whereof is internal and spaced from the border 405a of the membrane 405, which preferably surrounds the perforated regions of the tread 403.

The shoe 400 furthermore comprises a vapor-permeable or perforated insole 407 and a vapor-permeable or perforated filler layer 408 that is arranged between said insole 407 and the membrane 405.

The shoe 400 differs, with respect to the shoe 310, in that the membrane 405 is perimetrically glued directly to the tread 403, this part being free from the protective layer 406.

Figure 9:
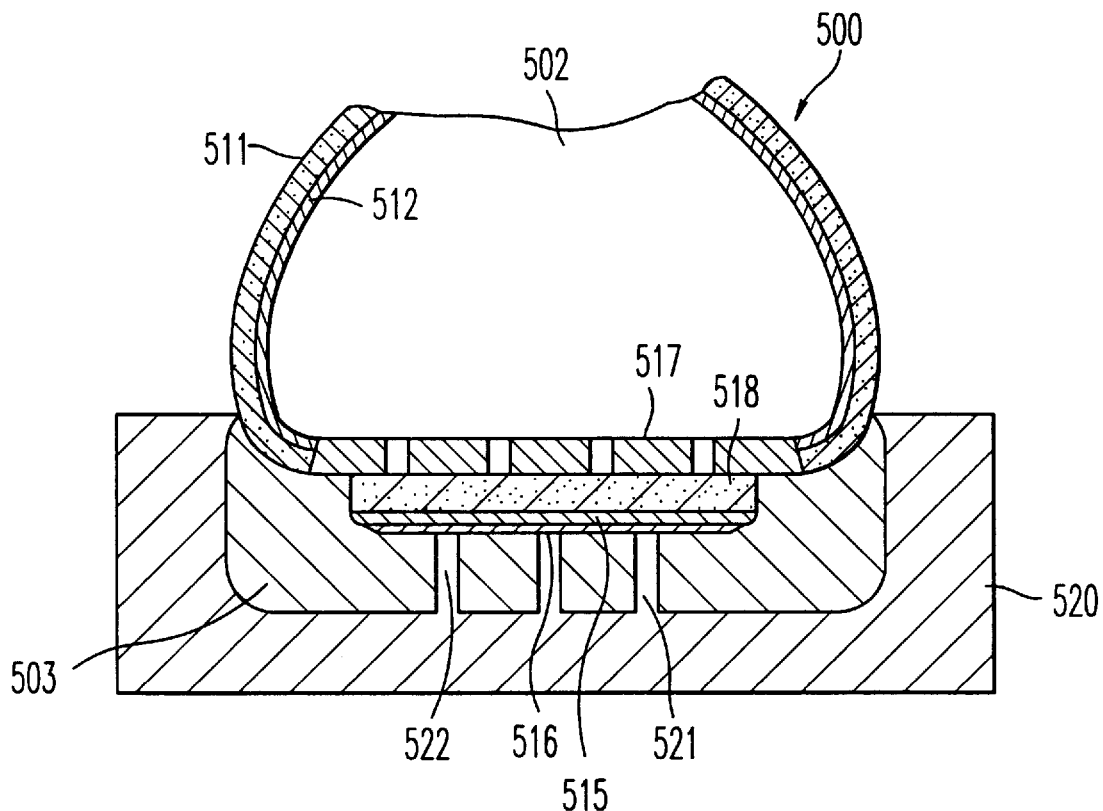
FIG. 9 is a transverse sectional view of a shoe according to the invention, in a sixth embodiment.

With particular reference to FIG. 9, a shoe according to the invention is generally designated by the reference numeral 500 in a sixth embodiment.

The shoe 500 can be produced with the following method: an insole 517, made of vapor-permeable material (for example natural leather) or perforated, is applied to an upper 511 that is also vapor-permeable (for example made of natural leather without sealing pigments) and is associated with a vapor-permeable or perforated lining 512.

Then, after inserting the upper 511 in the last 502 of a mold 520, a vapor-permeable filler layer 518 is first applied in a downward region, followed by a membrane 515 made of waterproof and vapor-permeable material, of the type commercially available under the trade-name GORE-TEX.

The membrane 515 and the protective layer 518 arranged above it are mutually assembled by perimetric gluing or by spot gluing, so as to avoid compromising the vapor-permeability of the shoe 500.

A protective layer 516 of hydrolysis-resistant, water-repellent, vapor-permeable or perforated material is associated below the membrane 515 and is smaller than the membrane 515 or perimetrically thinner.

The vapor-permeable element composed of the filler layer 518, the membrane 515, and the protective layer 516 is applied perimetrically or by spots below the insole 517 or is coupled or deposited above the hollow part of the mold 520 at the perforated part of the sole, above metallic pins 521 that will form holes 522.

The mold 520 is then closed over the upper 511, so that the contact between the insole 517, the vapor-permeable element formed by the filler layer 518, the membrane 515, and the protective layer 516 and said mold 520 prevents infiltration of the material above the metallic pins 521, obstructing the holes 522.

The material of the tread 503 is injected; by adhering to the membrane 515 around its perimeter, said material seals said tread 503 against water infiltration.

Said seal can be further ensured by adhesives adapted for the automatic sealing of the two surfaces.

The described method can also be used to form the sole on its own, without direct application to the upper.

Figure 10:
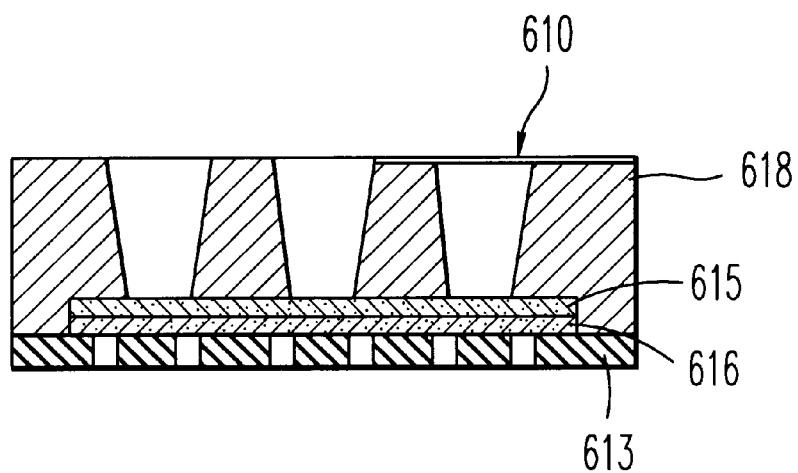
FIG. 10 is a front view of a detail of a shoe according to the invention, in a seventh embodiment.
Figure 11:
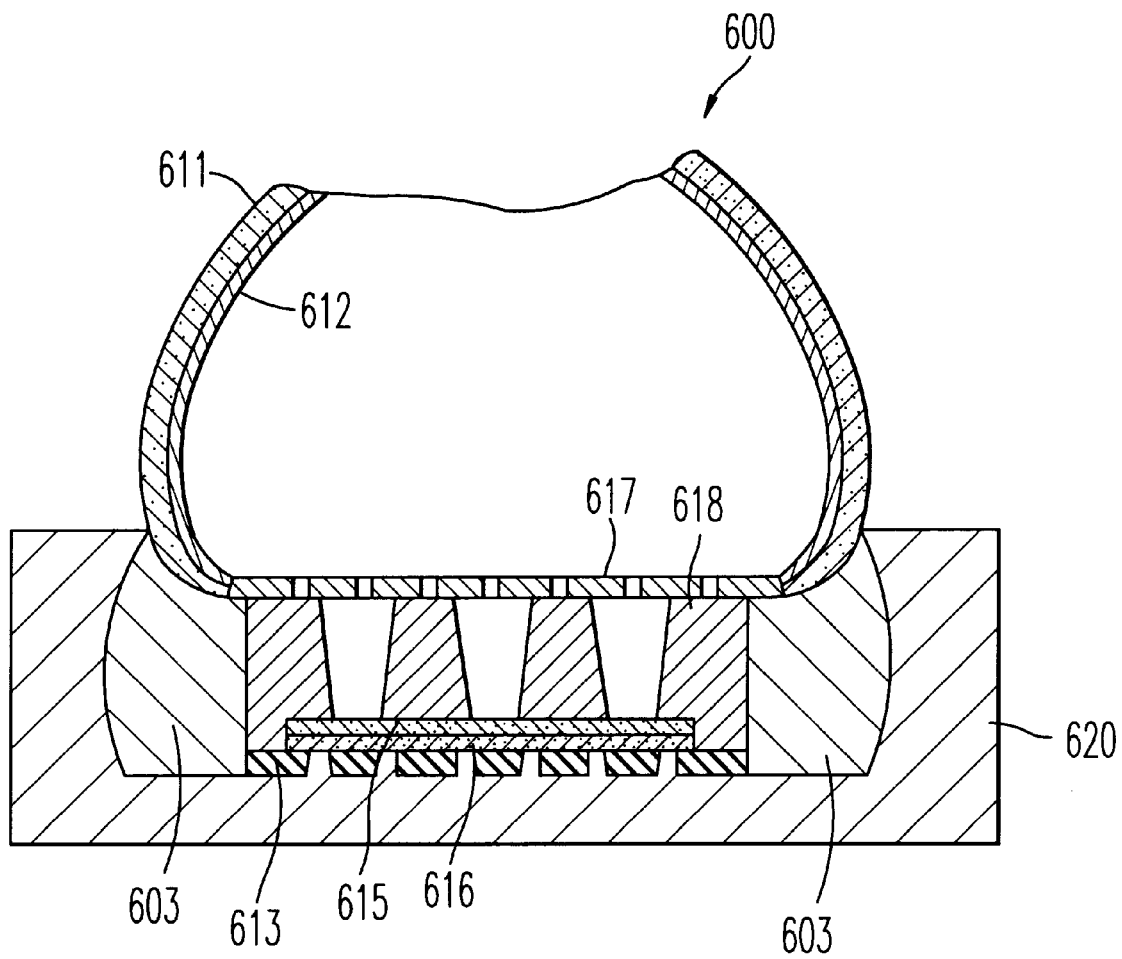
FIG. 11 is a transverse sectional view of a shoe according to the invention, in a seventh embodiment.

With particular reference to FIGS. 10 and 11, a vapor-permeable shoe according to the invention is generally designated by the reference numeral 600 in a seventh embodiment.

Said shoe 600 comprises a vapor-permeable upper 611 (made of natural leather without sealing pigments), which is associated with a vapor-permeable or perforated lining 612 by spot gluing, and an insole 617, which is also made of vapor-permeable material (for example natural leather) or is perforated.

The shoe 600, in this case, is obtained by following a method that entails the insertion of an insert 610 made of synthetic material in a mold 620.

Said insert 610 is preformed by means of a substantially lower first perforated tread element 613, above which a protective layer 616, a membrane 615, and then a perforated filler layer 618, which acts as upper seal, are associated.

Said components have the same vapor-permeable characteristics described in the above embodiments, since they in fact ensure the flow of transpiration from the inside of the shoe outwards.

Thus, the membrane 615 is made of waterproof and vapor-permeable material, such as GORE-TEX, and the protective layer 616 is made of hydrolysis-resistant, water-repellent, vapor-permeable or perforated material.

Once said insert 610, which is present throughout the thickness of the sole, has been inserted in the mold 620, said mold is closed and the second substantially perimetric tread element 603 is molded or injection-molded, so as to constitute an element that is monolithic with the insert 610 and with the upper 611.

Figure 12:
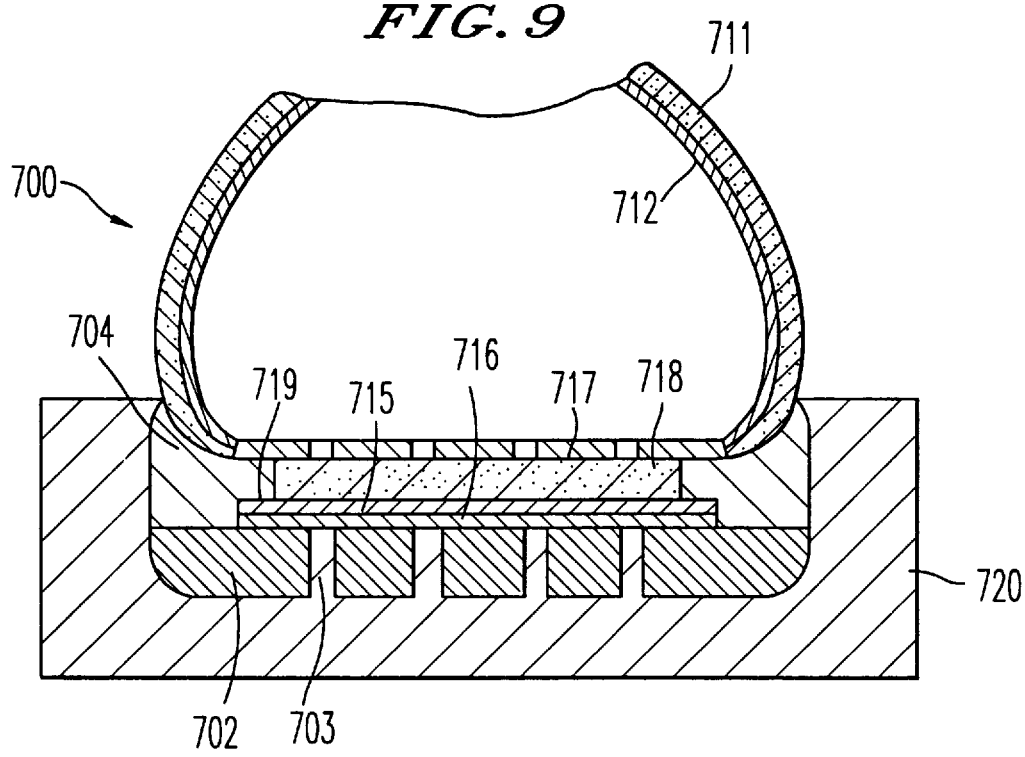
FIG. 12 is a transverse sectional view of a shoe according to the invention, in an eighth embodiment.

With particular reference to FIG. 12, a vapor-permeable shoe according to the invention is generally designated by the reference numeral 700 in an eighth embodiment.

The shoe 700 comprises an upper 711 that is associated with an internal lining 712, that is vapor-permeable or perforated as a whole and is provided with an insole 717 that is also made of vapor-permeable or perforated material and is assembled by spot gluing or along a perimetric band.

The shoe 700 is obtained by using a mold of the "two-color" type 720, according to a method for the injection-molding of a first substantially lower tread element 702 provided with holes 703.

Said first tread element 702 can conveniently also be molded separately and then inserted in the mold 720.

A protective layer 716 of the type used in the previous embodiments is arranged in an upward position at the region affected by the holes 703 and is directed downwards; a membrane 715, made of waterproof and vapor-permeable material, is placed above said layer.

A filler layer 718 is arranged above said membrane 715 and is vapor-permeable, as in this case, or perforated; said layer is smaller than the membrane 715, so as to leave a perimetric surface 719 of said membrane exposed.

Said surface 719 can be coated with glue to improve the seal of the shoe 700 against any water infiltrations.

The mold 720 is then closed so that the insole 717 sufficiently compresses the vapor-permeable mid-sole, which is composed of the combination of the filler layer 718, of the membrane 715, and of the protective layer 716, so as to avoid relative movements among the various components of the shoe.

By injecting the second tread 704, the seal is formed on the perimetric surface 719 and the structure becomes monolithic.

There is also a final embodiment of a vapor-permeable shoe that uses a "single-color" mold for the injection-molding of an entire tread monolithically.

This last vapor-permeable shoe configuration comprises an upper having an internal lining and an insole that are conveniently vapor-permeable or perforated.

A filler layer, a membrane, and a protective layer are placed on the lower face of the insole; said protective layer is directed downwards.

Said filler layer is also smaller than the membrane, so as to leave a perimetric surface of said membrane exposed.

The shoe is completed by injecting the material of the tread, on the lower face whereof holes are formed by means of metal pins.

In practice it has been observed that the present invention has achieved the intended aim and objects; in particular, it should be noted that the shoe according to the invention perfectly complies with the requirement of having an optimum exchange of heat and water vapor between the internal microclimate and the external climate, while nonetheless maintaining full waterproofing and moisture-proofing.

It should be noted that all this has been achieved while maintaining a shoe structure that is highly flexible and adaptable to any styling type and to any aesthetic and economical level required by the market.

It should also be noted that the shoe according to the invention can be mass-produced easily, since the operations can be fully automated.

Another remark should be made as to the fact that the shoe according to the invention allows a certain flexibility in terms of the association of its components, leading to considerable production savings in relation to flexibility and adaptability to various production conditions and situations.

The present invention is susceptible of numerous modifications and variations, all of which are within the scope of the inventive concept; all the details may furthermore be replaced with other technically equivalent elements.

The material and the dimensions may be any according to the requirements.

I claim:

1. Vapor-permeable shoe, comprising the following combination of elements:

a vapor-permeable upper having a vapor-permeable lining;

a tread layer made of perforated elastomer;

a mid-sole comprising at least one membrane made of waterproof vapor-permeable material that is associated with a lower protective layer made of hydrolysis-resistant, water-repellant, vapor-permeable material, said lower protective layer being disposed between said waterproof vapor permeable material and said tread layer;

a vapor-permeable insole;

a vapor-permeable filler layer arranged between said insole and said membrane;

said membrane having a perimeter and being coupled to said tread layer such that a seal against external water is ensured along the entire perimeter of said membrane.

2. Vapor-permeable shoe according to claim 1, wherein said lining is composite, since it comprises an externally directed layer, constituted by a waterproof and vapor-permeable membrane, and an internally directed layer, made of leather or vapor-permeable fabric, said lining being larger than said upper, the protruding border of said lining being folded upwards and outwards and being glued to the perimetric border of a waterproof and vapor-permeable membrane arranged below said insole and associated therewith, the association of both membranes forming a perimetric pocket for sealing against moisture and water.

3. Vapor-permeable shoe according to claim 1, wherein said lining is composite and is welded directly to the tread or to a sealing element that is formed monolithically with said tread.

4. Vapor-permeable shoe according to claim 1, wherein it comprises a vapor-permeable tip that is associated with said upper by spot gluing.

5. Vapor-permeable shoe according to claim 1, wherein it comprises a vapor-permeable rear counter that is associated with said upper by spot gluing.

6. Vapor-permeable shoe according to claim 1, wherein said lining and said upper are connected to one another by spot gluing.

7. Vapor-permeable shoe according to claim 1, wherein said upper and said insole are connected and sealed one to another by means of adhesive arranged along a perimetric region, so as to allow full transpiration in the central region.

8. Vapor-permeable shoe according to claim 1, wherein said membrane and said protective layer are connected by spot gluing.

9. A vapor-permeable shoe according to claim 8 wherein said spot glueing is accomplished using hydrolysis-resistant adhesives.

10. Vapor-permeable shoe according to claim 1, wherein said protective layer is made of non-woven fabric or needle-loomed felt.

11. Vapor-permeable shoe according to claim 1, wherein the association between said protective layer and said tread is provided by spot gluing with a hydrolysis-resistant adhesive.

12. Vapor-permeable shoe according to claim 1, wherein said upper and said insole are associated by means of stitches.

13. The vapor permeable shoe of claim 1 wherein the lower part of said upper, said tread and said mid-sole are perimetrically sealed at coupling regions around the perimeter of said shoe.

14. A vapor-permeable shoe according to claim 1 wherein said tread layer and said membrane are sealed to one another by glueing with hydrolysis-resistant adhesives.

15. A vapor-permeable shoe according to claim 1 wherein said tread layer and said membrane are sealed to one another by high frequency welding.

16. A vapor-permeable shoe according to claim 1 wherein said tread layer and said membrane are sealed to one another by overlap injection-molding of a material that is compatible with the material of said tread.

17. A vapor-permeable shoe as set forth in claim 1 wherein said lining is perforated.

18. A vapor-permeable shoe as set forth in claim 1 wherein said insole is perforated.

19. A vapor-permeable shoe as set forth in claim 1 wherein said filler layer is perforated.

20. A vapor permeable shoe as set forth in claim 1 wherein said protective layer is attached to said membrane and is arranged below said membrane between said membrane and said perforated tread layer and is located directly above said perforated elastomer in direct correspondence with the perforations of said elastomer tread.

21. Vapor-permeable shoe, comprising the following combination of elements:

a vapor-permeable upper associated with a vapor-permeable or perforated lining;

a tread made of perforated elastomer;

a mid-sole comprising at least one membrane made of waterproof and vapor-permeable material, associated with a lower protective layer made of hydrolysis-resistant, water-repellent, vapor-permeable, or perforated material;

a vapor-permeable or perforated insole;

a vapor-permeable or perforated filler layer arranged between said insole and said membrane;

said tread and said membrane being sealed in the perimetric coupling regions, where said lower protective layer is thinner or not present.

22. Vapor-permeable shoe according to claim 21, wherein said tread has a raised border that contains said mid-sole.

23. Vapor-permeable shoe according to claim 21, wherein said filler layer is made of vapor-permeable felt.

24. Vapor-permeable shoe according to claim 21, wherein said upper and said insole are associated one another by gluing or by means of stitches along a perimetric band.

25. Vapor-permeable shoe according to claim 21, wherein said membrane and said protective layer are associated by spot gluing with hydrolysis-resistant adhesive or by calendered powders.

26. Vapor-permeable shoe according to claim 21, wherein said protective layer is made of non-woven fabric or needle-loomed felt.

27. Vapor-permeable shoe according to claim 21, wherein the association and seal between said tread and said membrane is provided by gluing with hydrolysis-resistant adhesives or by high-frequency welding or by overlap injection-molding of a material that is compatible with the material of said tread, so as to form a perimetric seal.

28. Method for manufacturing a shoe according to claim 21, consisting in:

fitting said upper, with an insole and a lining, on the last of a mold for injection-molding;

applying, in a downward region, said filler layer with a membrane and a protective layer;

closing the mold and injecting said tread so as to seal the entire assembly with respect to the upper.

29. Method for producing a shoe according to claim 28, wherein auxiliary adhesives, adapted to seal the surfaces one another, can contribute to the sealing action.

30. Method for producing a shoe according to claim 12, wherein auxiliary adhesives, adapted to seal the surfaces one another, can contribute to the sealing action.

31. Shoe according to claim 21, wherein said tread comprises two monolithic elements that are formed by successive injection-molding operations, a first element being arranged substantially below said membrane and a second element being perimetric.

32. Method for producing a shoe according to claim 31, consisting in:

molding an insert with a first perforated tread element, a membrane, a protective layer, and a filler layer made of perforated elastomer;

inserting said insert in a mold and fitting the upper, with the insole and the lining, on the last;

molding the second tread element and sealing the entire assembly.

33. Vapor-permeable shoe, comprising the following combination of elements:

a vapor-permeable upper having a vapor-permeable lining;

a tread layer made of perforated elastomer;

a mid-sole comprising at least one membrane made of waterproof vapor-permeable material that is hydrolysis-resistant, water-repellant and vapor-permeable, said membrane having a perimeter;

a vapor-permeable insole;

a vapor-permeable filler layer arranged between said insole and said membrane and having perimetric dimensions that are smaller than those of said membrane;

said tread layer being sealed to said membrane in the perimetric coupling regions of said membrane.

34. A vapor-permeable shoe as set forth in claim 33 wherein said lining is perforated.

35. A vapor-permeable shoe as set forth in claim 33 wherein said insole is perforated.

36. A vapor-permeable shoe as set forth in claim 33 wherein said filler layer is perforated.

37. Method for producing a shoe according to claim 33, consisting in:

fitting said upper, together with an insole and a lining, on the last of a mold for injection-molding;

applying, in a downward region, said filler layer, which has smaller dimensions, together with a membrane, a protective layer, and optional pre-molded parts of a perforated tread;

closing the mold and injection-molding said tread or the remaining tread parts so as to seal the entire assembly to the upper.

38. A vapor-permeable shoe with an inside for accommodating a user's foot, the shoe comprising:

an upper;

an insole connected to said upper and allowing water transpiration from the inside of said shoe to outside said shoe through said insole;

a perforated tread made of elastomer and allowing water transpiration from the inside of said shoe to outside said shoe through said perforated tread;

a mid-sole component attached to said tread so as to be arranged between said tread and said insole and allowing water transpiration from the inside of said shoe to outside said shoe through said mid-sole component and prohibiting water entrance from outside said shoe to the inside of said shoe through said mid-sole component;

said tread and said mid-sole component being attached to said upper and said insole such that said mid-sole component is arranged between said insole and said tread for allowing water transpiration from the inside of said shoe to outside said shoe through said insole and through said mid-sole component and through said perforated tread, and for prohibiting said water entrance from outside said shoe to the inside of said shoe through said mid-sole component;

said mid-sole component comprising a membrane of waterproof and vapor-permeably material for allowing said water transpiration from the inside of said shoe to outside said shoe through said mid-sole component and for prohibiting said water entrance from outside said shoe to the inside of said shoe through said mid-sole component;

said mid-sole component further comprising a protective layer attached to said membrane and arranged below said membrane between said membrane and said perforated tread and directly above said perforated elastomer tread in correspondence with perforations of said perforated elastomer tread for protecting said membrane from impacts and penetration of foreign objects through said perforations of said perforated tread.

39. The shoe of claim 38 wherein said mid-sole component further comprises:

a thermoplastic perforated layer arranged between said insole and said membrane for allowing said water transpiration from the inside of said shoe to outside said shoe through said thermoplastic perforated filler layer of said mid-sole component.

40. The shoe of claim 38, further comprising:

a hydrolysis resistant adhesive connecting said protective layer to said membrane.

41. A method of manufacturing a vapor-permeable shoe with an inside for accommodating a user's foot, the method comprising the steps of:

providing an upper;

providing an insole;

connecting said insole to said upper so as to allow water transpiration from the inside of said shoe to outside said shoe through said insole;

providing a perforated tread made of elastomer;

providing a mid-sole component;

attaching said tread and said mid-sole component to the mutually attached upper and insole such that said mid-sole component is arranged between said insole and said tread for allowing water transpiration from the inside of said shoe to outside said shoe through said insole and through said mid-sole component and through said perforated tread, and for prohibiting water entrance from outside said shoe to the inside of said shoe through said mid-sole component;

the step of providing said mid-sole component comprising:

providing said mid-sole component with: a membrane of waterproof and vapor-permeable material for allowing said water transpiration from the inside of said shoe to outside said shoe through said mid-sole component and for prohibiting said water entrance from outside said shoe to the inside of said shoe through said mid-sole component; and a protective layer attached to said membrane and arranged below said membrane between said membrane and said perforated tread and directly above said perforated tread in correspondence with perforations of said perforated tread for protecting said membrane from impacts and penetration of foreign objects through said perforations of said perforated tread.

42. The method of claim 41, wherein the step of providing said mid-sole component further comprises:

providing said mid-sole component with a thermoplastic perforated filler layer arranged between said insole and said membrane for allowing said water transpiration from the inside of said shoe to outside said shoe through said thermoplastic perforated filler layer of said mid-sole component.

43. The method of claim 41 wherein the step of providing said mid-sole component further comprises:

providing a hydrolysis resistant adhesive connecting said protective layer to said membrane.

44. A vapor permeable shoe comprising a vapor-permeable upper having a vapor permeable lining, a vapor permeable insole, a perforated tread wear layer and a waterproof, vapor-permeable membrane disposed above said tread wear layer in such manner that the perimeter of said membrane is in external water sealing relationship with said tread wear layer but the central portion of said membrane is not sealed such that the central portion remains waterproof but vapor-permeable, said shoe having a protective layer of hydrolysis-resistant, water-repellant, vapor-permeable material disposed between said waterproof vapor-permeable membrane and said perforated tread layer.

45. A vapor-permeable shoe as set forth in claim 44 wherein said insole is perforated.

46. A vapor-permeable shoe as set forth in claim 44 wherein said lining and said insole are perforated.

* * * * *